(12) United States Patent
Yang (10) Patent No.: US 9,254,916 B2
(45) Date of Patent: Feb. 9, 2016

(54) VERTICAL TAKE-OFF AND LANDING AIRCRAFT WITH TILTROTOR POWER FOR USE ON LAND AND IN AIR

(76) Inventor: Zhaoxi Yang, Shijiazhuang (CN)

( * ) Notice: Subject to any disclaimer, the term of this patent is extended or adjusted under 35 U.S.C. 154(b) by 128 days.

(21) Appl. No.: 14/128,992

(22) PCT Filed: Jun. 6, 2012

(86) PCT No.: PCT/CN2012/076524
§ 371 (c)(1),
(2), (4) Date: Dec. 23, 2013

(87) PCT Pub. No.: WO2012/174988
PCT Pub. Date: Dec. 27, 2012

(65) Prior Publication Data
US 2014/0124613 A1    May 8, 2014

(30) Foreign Application Priority Data

Jun. 21, 2011  (CN) .......................... 2011 1 0167392

(51) Int. Cl.
| B64C 29/00 | (2006.01) |
| B64C 37/00 | (2006.01) |
| B64C 3/54  | (2006.01) |
| B64C 39/04 | (2006.01) |

(52) U.S. Cl.
CPC ................ B64C 37/00 (2013.01); B64C 3/546 (2013.01); B64C 29/00 (2013.01); B64C 29/0033 (2013.01); B64C 39/04 (2013.01)

(58) Field of Classification Search
CPC  B64C 29/00; B64C 29/0008; B64C 29/0016; B64C 29/0033; B64C 37/00
USPC ......... 244/7 R, 7 C, 12.4, 23 A, 17.23, 17.25, 244/17.27
See application file for complete search history.

(56) References Cited

U.S. PATENT DOCUMENTS

| 2,868,476 A | 1/1959 | Schlieben |
| 3,090,581 A | 5/1963 | Einarsson |

(Continued)

FOREIGN PATENT DOCUMENTS

| CN | 200920053565.0 | 3/2010 |
| CN | 102363445 A | 2/2012 |

*Primary Examiner* — Christopher P Ellis
*Assistant Examiner* — Richard G Davis
(74) *Attorney, Agent, or Firm* — Harness, Dickey & Pierce, P.L.C.

(57) ABSTRACT

A vertical take-off and landing aircraft with tiltable power for use on land and in the air includes: a body (3) provided with a drive device; wheels (8) being controlled to make the body move on the ground; and a front thruster (1) and a rear thruster (2) controlling the body to fly or take off/land, wherein transmission brace rods (5) are arranged on both sides of the body, and a first pivot (9) passes transversely through the body and is connected to the transmission brace rods on both sides of the body; wherein the front thruster is fixed on front ends of the transmission brace rods, and the rear thruster is fixed on rear ends of the transmission brace rods; wherein the central axes of the front and rear thrusters are perpendicular to the plane formed by the two transmission brace rods. By controlling a tilting angle of the front/rear thrusters, this aircraft has two basic functions of vertical take-off/landing and horizontal flight, so as to facilitate conversion between land travel and air flight. During flight in the air, the aircraft body always remains in horizontal state, thereby making the occupants feel comfortable and providing them with broad vision so as to operate the aircraft safely.

9 Claims, 12 Drawing Sheets

(56) References Cited

U.S. PATENT DOCUMENTS

| | | | |
|---|---|---|---|
| 3,350,035 A | 10/1967 | Schlieben | |
| 4,537,372 A * | 8/1985 | Forizs | 244/12.4 |
| 6,402,088 B1 | 6/2002 | Syrovy et al. | |
| 9,045,226 B2 * | 6/2015 | Piasecki et al. | |
| 2006/0226281 A1 | 10/2006 | Walton | |
| 2010/0051740 A1 | 3/2010 | Yoeli | |
| 2012/0261523 A1 * | 10/2012 | Shaw | 244/7 R |

* cited by examiner

VERTICAL TAKE-OFF AND LANDING AIRCRAFT WITH TILTROTOR POWER FOR USE ON LAND AND IN AIR

CROSS-REFERENCE TO RELATED APPLICATIONS

This application is a U.S. National Stage Application of International Application No. PCT/CN2012/076524, filed Jun. 6, 2012, and published in Chinese as WO/2012/174988 on Dec. 27, 2012. This application claims the priority to Chinese Application No. 201110167392.7, filed Jun. 21, 2011. The disclosures of the above applications are incorporated herein by reference.

TECHNICAL FIELD

This invention relates to a small aircraft, and in particular, to a vertical take-off and landing aircraft with tiltable power for use on land and in air.

BACKGROUND ART

U.S. Pat. No. 3,090,581 discloses a flying car, wherein the flying car is provided at the front and rear portions of its body with a respective tiltable propeller, which can be stowed in the body.

When the flying car is flying in the air, the front and rear propellers are open with its propeller shaft horizontal, so that the propellers can generate a backward thrust force. When the thrust force is increased to a certain degree, the flying car will be ready to fly. This kind of flying car has the following disadvantages: firstly, the flying car cannot take off and land vertically; secondly, high-speed rotating of the propellers might hurt persons when the flying car operates on the ground; thirdly, the flying car has a complex structure with too many moving parts, and thus is difficult to be manufactured.

Chinese patent application No. CN200920053565.0 discloses a vertical take-off and landing flying car with two ducted propellers, wherein the two ducted fans are mounted onto the front and rear portions of a body of the flying car respectively, with a windward side of each fan upward; and wherein four wheels of the flying cars can also serve as an undercarriage of an aircraft. When taking off and landing, the flying car can be provided with a lift force by the two ducted fans arranged on the body of the flying car, so as to realize vertical take-off and landing. When flying in the air, the front portion of the flying car is tilted downward by a certain angle, so that the two ducted fans provide horizontal component forces, which thrust the aircraft to fly in a horizontal direction. This kind of flying car has the following disadvantages: firstly, it cannot fly at a high speed; secondly, when flying, the body of the flying car is tilted forward, which will make the driver very uncomfortable and hard to observe the conditions ahead of the flying car.

SUMMARY OF THE INVENTION

The invention aims to provide a vertical take-off and landing aircraft with tiltable power for use on land and in the air, which could overcome the defects of not being able to both take off and land vertically and fly rapidly in the horizontal direction in the prior art aircraft, and realize simple conversion of travel on land or flight in the air, and make the driver sit and drive comfortably.

The object of the invention is realized by a vertical take-off and landing aircraft with tiltable power for use on land and in the air, including: a body provided with a drive device; wheels controlled by said drive device to make said body move on the ground; and a front thruster and a rear thruster controlling said body to fly or take off/land, wherein transmission brace rods are arranged on both sides of said body respectively, and a first pivot passes transversely through said body and is connected with said transmission brace rods on both sides of said body respectively; wherein said front thruster is located in front of said body and fixed between front ends of the two transmission brace rods, and said rear thruster is located in the back of said body and fixed between rear ends of the two transmission brace rods; and wherein the central axes of said front and rear thrusters are perpendicular to the plane formed by the two transmission brace rods.

In the present invention, a unique "H"-shaped lift-sedan-type aircraft with tiltable power is formed by connecting the first pivot passing transversely through the body with the transmission brace rods on both sides of the body, and connecting the transmission brace rods with the front and rear thrusters. When the front and the rear thrusters in front and back of the body remain at the initial horizontal position, the vertical downward thrust generated by the two thrusters can slowly lift the body off from the ground, thus realizing the vertical lift of the aircraft. When the aircraft climbs to a certain height, the transmission brace rods and thus the front and rear thrusters are tilted by a tilting angle with a certain inclination degrees (the tilting angle is less than 90°) relative to the body, by means of the thrust difference produced by the front & rear thrusters, or through the action control of the tilting mechanism arranged in the aircraft, while the body still remain in the horizontal state. At this time, the thrust generated by the tilted front & rear thrusters is divided into a horizontal force for providing forward power for the aircraft and a vertical force for providing lift for the aircraft. In combination of the flight lift provided by the body with aerodynamics design, the aircraft according to the invention can realize fast horizontal flight in the air. When the tilting angle of the front & rear thrusters is at a maximum of 90°, the thrust of the front & rear thrusters are all transformed into forward driving force for the aircraft, while the flight lift is all provided by the body. At this time, the aircraft is flying horizontally at a maximum speed and in the most economical manner. When the aircraft is to land, the transmission brace rods and thus the front & rear thrusters are slowly tilted simultaneously so as to return to the horizontal position. At this time, the thrust generated by the front & rear thrusters are all used to provide vertical lift. By slowly decreasing the thrust of the front & rear thrusters synchronously, the aircraft can slowly land on the around, thus realizing vertical landing of the aircraft.

During the entire flight, the body of the aircraft for use on land and in the air according to the present invention always remains in horizontal state, thereby making the occupants feel comfortable and provide them with a broad vision. When the aircraft is on the ground or lands on the ground, after locking the first pivot and the transmission brace rods, it is possible to drive the wheels by operating the drive device in the body, and thus move the body forward (just like driving ordinary land vehicles), thus realizing land travel of the aircraft and convenient land/air conversion.

Said first pivot passes transversely through a middle portion of said body and connected to the said transmission brace rods at their middle points; said transmission brace rods driven by said first pivot is tiltable in a range of 0-90°; when being tilted, said front thruster is tilted downwards while said rear thruster is tilted upwards.

Lateral thrusters are connected at the outside of the two transmission brace rods respectively, and are connected to the ends of said first pivot.

Said first pivot passes transversely though a tail portion of said body and connected to rear segments of said transmission brace rods; a deflection control mechanism is provided between said body and said transmission brace rods; said transmission brace rods driven by said deflection control mechanism are tiltable in a range of 0-90°, so that said front thruster is tilted downwards and said rear thruster is tilted upwards.

Said body is provided with fixed wings, folded wings or movable wings.

The movable wings are arranged on the bottom of said body and connected with a third pivot protruding from the bottom of said body, thus allowing the movable wings to be stowed under or extended out of the bottom of the body.

Said fixed wings are connected on both sides of said body, tail brace rods stretching backwards horizontally are connected to said fixed wing, and a tail is fixed on rear ends of said tail brace rod.

Said wheels are of a fixed or retractable structure, mounted on said body, or on said front thruster and said rear thruster respectively.

Driving means for driving said front thruster and said rear thruster are installed in said body, or in said front and rear thrusters.

The front and rear thrusters are ducted fans, propellers or turbofan engines.

By controlling the tilting angle of the thrusters arranged in front and back of the body, the aircraft for use on land and in the air according to the present invention has two basic functions of vertical takeoff/landing and horizontal flight, and realizes convenient conversion between land travel and air flight. During flight in the air, the body of the aircraft always remains in horizontal state, thereby making the occupants feel comfortable and providing them with broad vision so as to operate the aircraft safely. The aircraft for use on land and in the air according to the present invention has the advantages of simple structure, convenient operation and control, and occupying less area on the ground and being easy to travel on the ground.

The invention has the following advantages: 1. the front and rear thrusters can maintain in balance without external force, when the aircraft is on the ground, hovering, and performing vertical take-off/landing; 2. in the process of tilting the front & rear thrusters, it is possible to maintain synchronization of the tilting angle without external force; 3. the front & rear thrusters can simply realize the same speed by means of the transmission brace rods; 4. in case of one thruster losing power, the other thruster can still simply provide power through the transmission brace rods, so as to enhance the safety; 5. the wheels are arranged and mounted easily, facilitating driving and operating on the ground; 6. during flight in the air, the body itself has substantially no interference with inlet air of the ducted fan; 7. during horizontal flight in the air, the body serves as a lifting body with high efficiency and economic operation; 8. the aircraft of the invention has no dead weight; and, 9. the aircraft of the invention has a simple structure, safe and reliable, and easy to perform land/air conversion.

The various components and the mark numbers throughout the drawings are as follows: front thruster 1, rear thruster 2, body 3, deflector 4, transmission brace rod 5, deflection control mechanism 6, second pivot 7, wheel 8, first pivot 9, movable wing 10, third pivot 11, fixed wing 12, tail brace rod 13, tail 14, rotor 15, lateral thruster 16, lever 17, duct 18, blade 19, propeller shaft 20, drive shaft 21.

SPECIFIC MODE FOR CARRYING OUT THE INVENTION

Example 1

Figure 1:
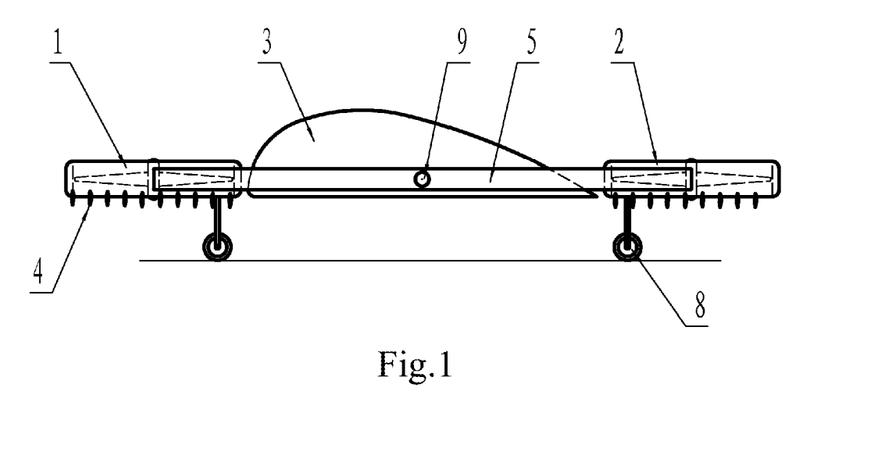
FIG. 1 is a schematic view of an aircraft according to the invention, with a first pivot passing transversely through a middle portion of a body.
Figure 2:
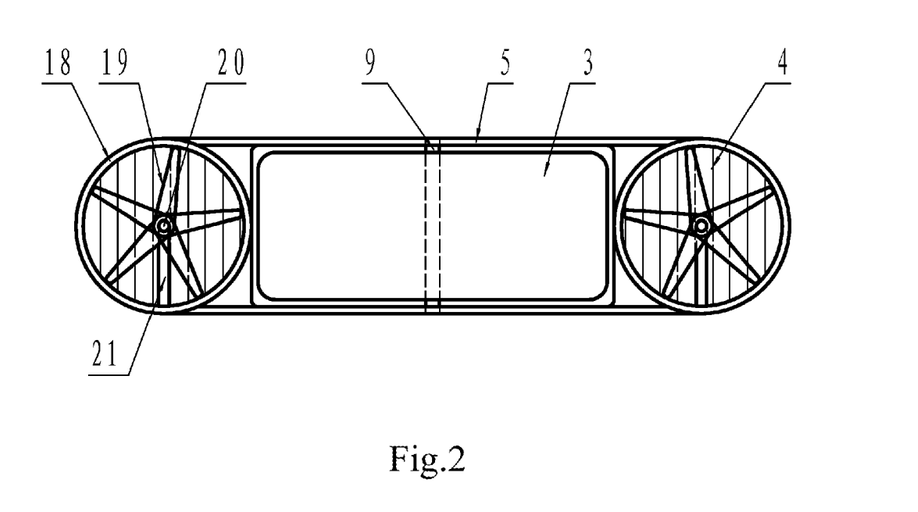
FIG. 2 is a top view of the aircraft shown in FIG. 1.
Figure 3:
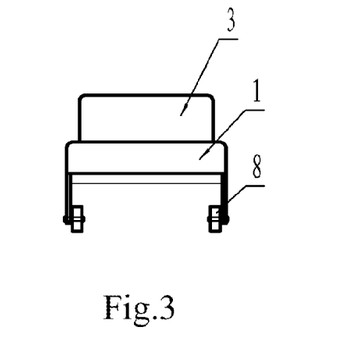
FIG. 3 is a left view of the aircraft shown in FIG. 1.

As shown in FIGS. 1-3, the present aircraft has a body 3, which is designed in accordance with the principles of aerodynamics, and in which an autopilot, a drive device, and a pivot rotation controller (or "tilting mechanism"), etc. can be installed. A first pivot 9 passes transversely through the middle portion of the body 3 with both ends of the first pivot extending out of the body 3. The two ends are connected with transmission brace rods 5 arranged on both sides of the body respectively, and the connecting points are located at the middle point of the transmission brace rods (FIG. 1). This allows keeping front and rear thrusters in balance when the front and the rear thrusters and the body are not subject to external forces. The two transmission brace rods 5 are parallel to each other, and perpendicularly connected to a first pivot 9, thereby constituting an "H"-shaped carrying-sedan structure (FIG. 2).

Between the front ends of the two transmission brace rods 5 is fixed the front thruster 1, and between the rear ends of the two transmission brace rods 5 is fixed the rear thruster 2. The front and rear thrusters are located in front and back of the body 3 respectively and align with the body 3 in the longitudinal direction. The front thruster 1 and the rear thruster 2 are arranged horizontally with their central axes perpendicular to the plane formed by the two transmission brace rods 5. The transmission brace rods 5 driven by the first pivot 9 are tiltable in a range of 0-90°. When tilted, the front thruster 1 is tilted downwards while the rear thruster 2 is tilted upwards.

The front thruster 1 and the rear thruster 2 are the mechanisms which are used to control the body 3 to perform flight or take-off and landing, and comprise ducted fans (FIG. 2), each including a duct 18, blades 19 and a propeller shaft 20, etc. which are connected in conventional manner. The ducted fans are further provided with transverse and/or longitudinal deflectors 4 so as to improve the guidance control of air flow. In addition, since the deflectors under the front and rear ducted fans can be deflected, the aircraft can perform vertical take-off/landing and horizontal flight.

In FIG. 1, wheels 8 are arranged at the bottoms of the front thruster 1 and the rear thruster 2 respectively, and of course, may also be arranged at the bottom of the body 3. The wheels 8 may be of a fixed or retractable installation structure, and controlled by the drive device in the body, to drive the body 3 to move and travel on the around.

In the body 3 is installed driving means, which drive the front and rear thrusters rotate via a transmission mechanism installed in the first pivot 9 and the transmission brace rods 5. Of course, in this case, the ducted fan should also be provided with a drive shaft 21 (FIG. 2) to transmit rotary power to the blades 19. It is also possible to install engines or motors and other driving means directly on the front and rear ducted fans to directly drive the blades 19. In this case, it is possible to omit the transmission mechanism arranged in the first pivot and the transmission brace rods and also omit the drive shaft 21 and other parts in the ducted fan.

Figure 4:
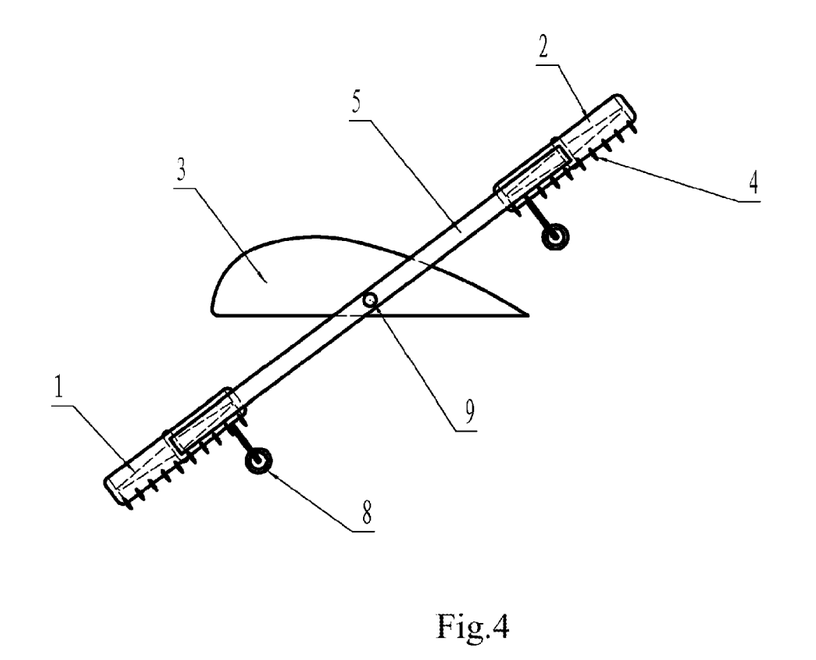
FIG. 4 is a schematic view of the aircraft shown in FIG. 1, which is in flying state.
Figure 5:
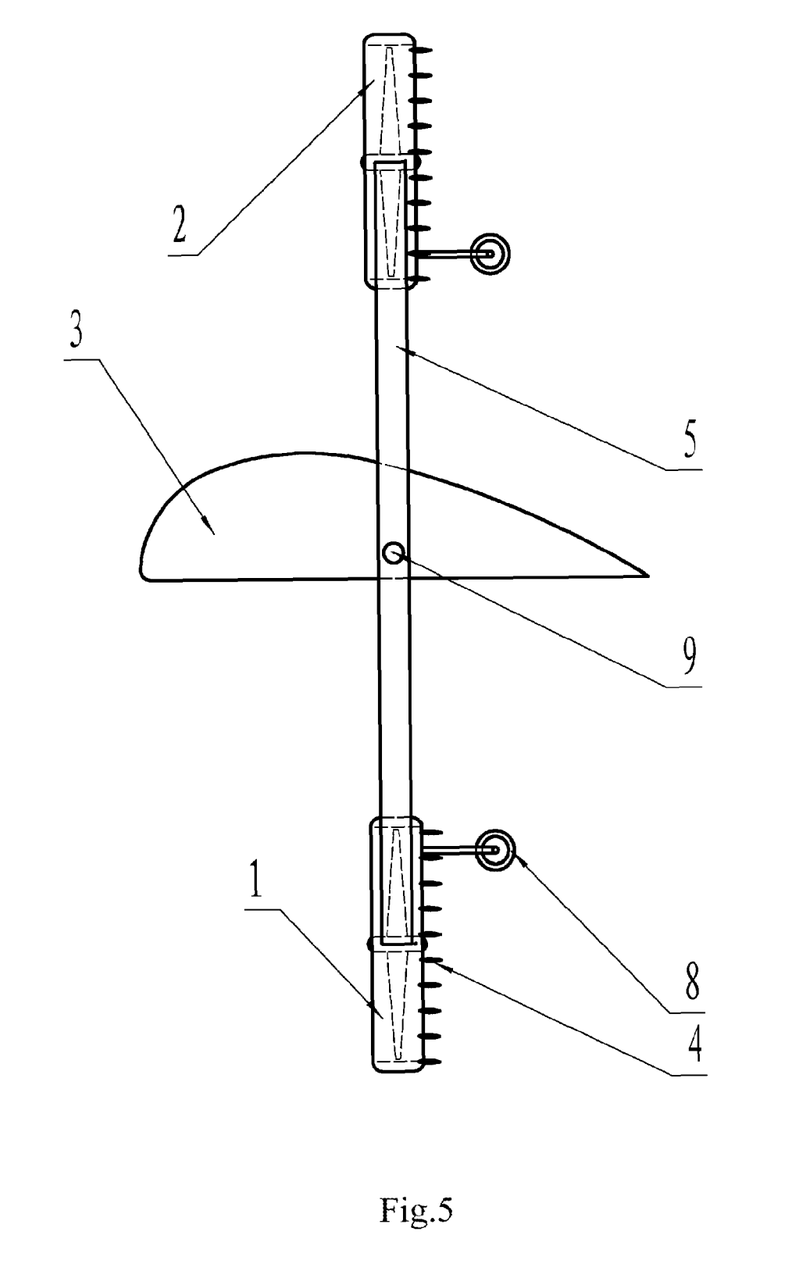
FIG. 5 is a schematic view of the aircraft shown in FIG. 1, which is flying at a maximum speed.

FIG. 1 shows the aircraft when parked on the ground, traveling and vertically taking off and landing. At these states, the body 3, the two ducted fans and the two transmission brace rods 5 etc are all parallel to the ground. After the aircraft vertically takes off from the ground, the front and rear ducted fans are tilted by a certain angle (FIG. 4) owing to thrust difference of the front and rear ducted fans, or by using a pivot rotation controller to control the two transmission brace rods 5. The aircraft is thus in the horizontal flight state in the air. When the transmission brace rods are tilted by a maximum degree of 90° (i.e., the transmission brace rods 5 perpendicular to the ground) (as shown in FIG. 5), the aircraft can fly at a maximum speed in the horizontal flight state.

The invention can also be provided with a whole-aircraft parachute installed on Body 3, to enhance the safety of the aircraft.

Example 2

Figure 6:
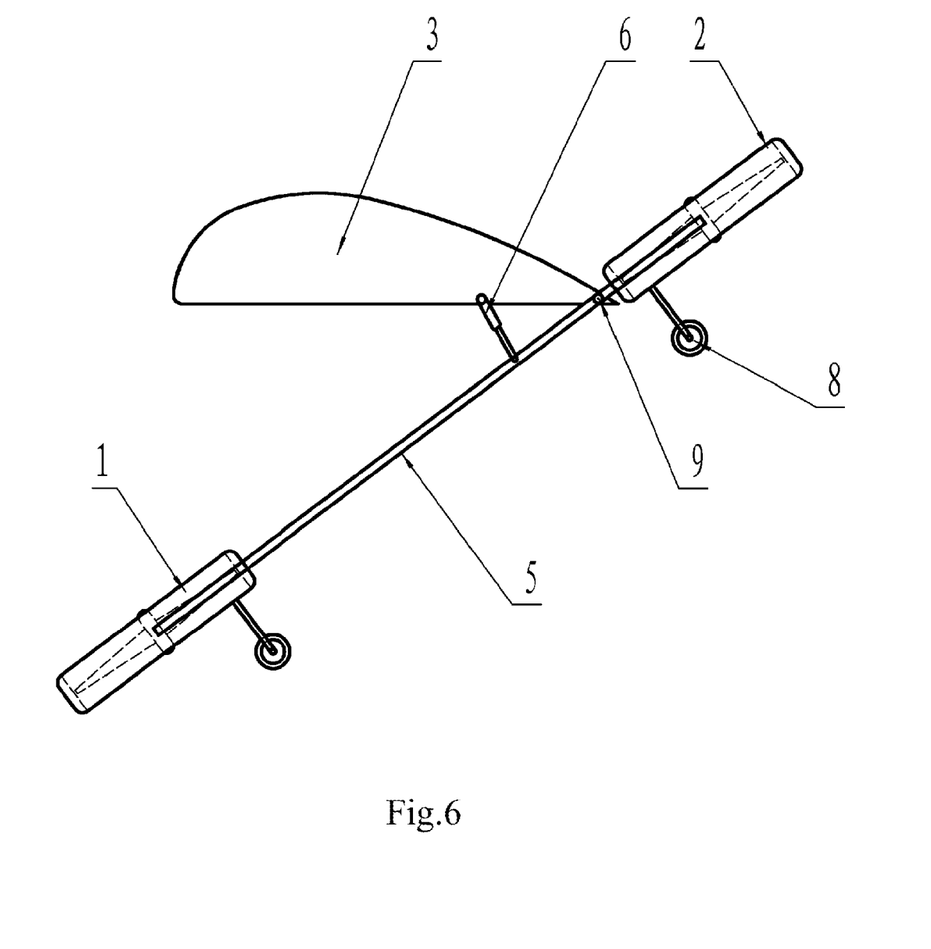
FIG. 6 is a schematic view of an aircraft according to the invention, with the first pivot passing transversely through the tail of the body.
Figure 7:
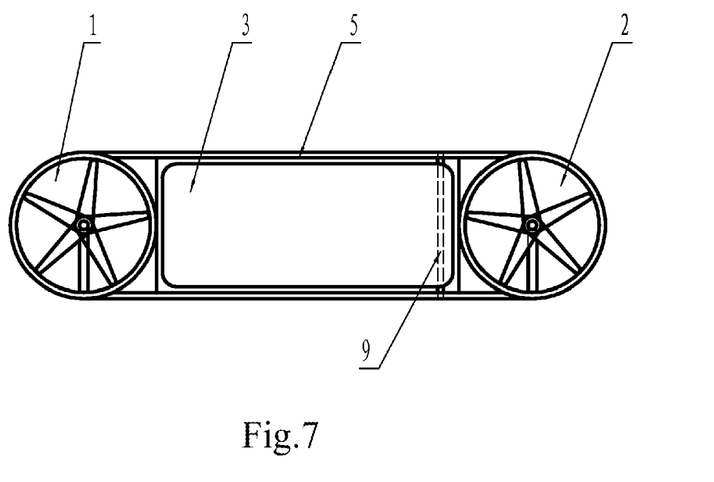
FIG. 7 is a top view of the aircraft shown in FIG. 6.

As shown in FIG. 6 and FIG. 7, the aircraft in this example is substantially the same as that in Example 1, except that the first pivot 9 passing transversely through the tail portion of the body 3 and is connected to the rear segments of the transmission brace rods 5. Accordingly, between the body 3 and the transmission brace rods 5 is installed a deflection control mechanism 6 controlling the deflection of the transmission brace rods 5. Via the deflection control mechanism 6, the transmission brace rods 5 may be driven to rotate in the range of 0-90°, so that the front thruster 1 is tilted downwards and the rear thruster 2 is tilted upwards. The deflection control mechanism 6 may comprise a hydraulic cylinder or pneumatic cylinder and other mechanical device.

Example 3

Figure 8:
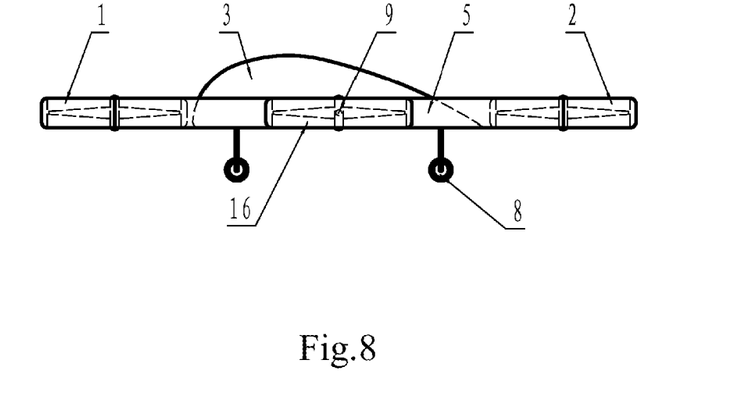
FIG. 8 is a schematic view of an aircraft according to the invention, wherein the aircraft is further provided with lateral thrusters.
Figure 9:
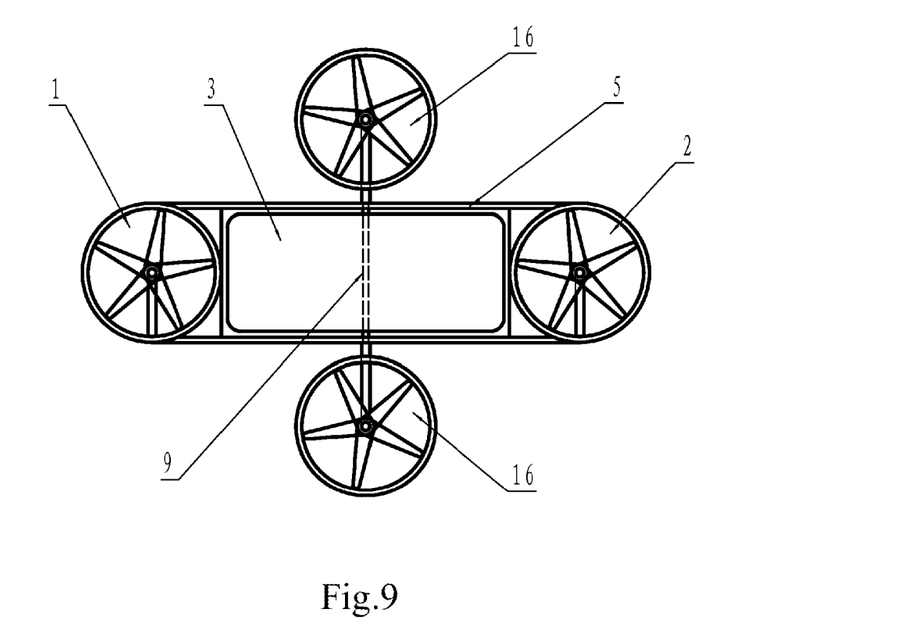
FIG. 9 is a top view of the aircraft shown in FIG. 8.

As shown in FIG. 8 and FIG. 9, the aircraft in this example is substantially the same as that in Example 1, except that the aircraft is further provided with two lateral thrusters 16, and the wheels 8 are installed on the bottom of the body 3.

In FIG. 9, the two ends of the first pivot 9 extend transversely out of the middle portion of the body 3, firstly are connected with the transmission brace rods 5 on the two sides of the body 9, and then each are connected externally to one lateral thruster 16. Thus, the aircraft is provided with ducted fans in the front, rear, left and right directions of the body 3. The two lateral thrusters 16 are tilted by the first pivot 9, and the lateral thrusters 16 on the one hand and the front thruster 1 and the rear thruster 2 connected to the transmission brace rods 5 on the other hand may be tilted synchronously or asynchronously.

Due to the increased thrust forces, this aircraft can carry increased load and its flight stability and safety can be increased accordingly.

Example 4

Figure 10:
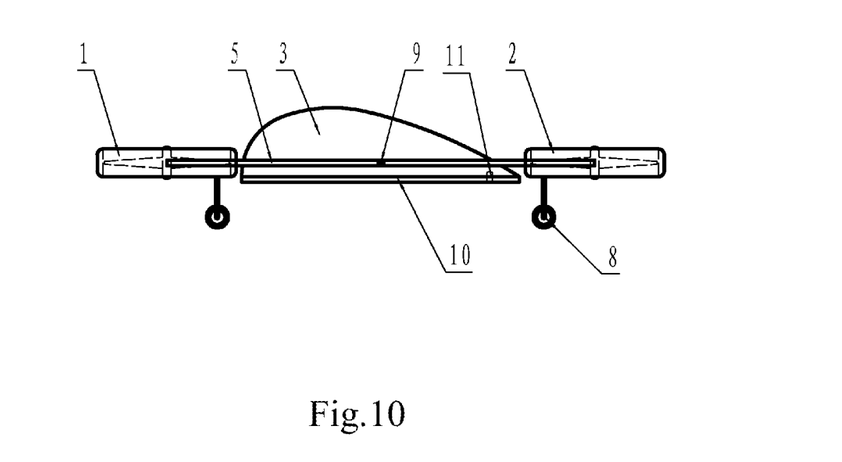
FIG. 10 is a schematic view of an aircraft according to the invention, wherein the aircraft is further provided with movable wings.
Figure 11:
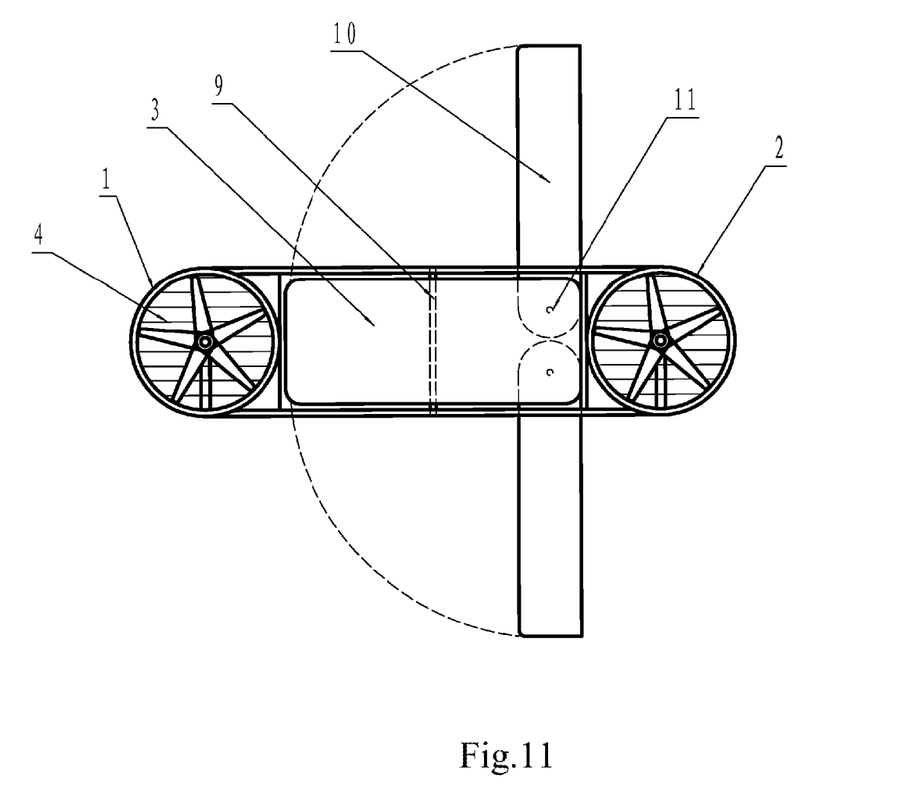
FIG. 11 is a top view of the aircraft shown in FIG. 10.

As shown in FIG. 10 and FIG. 11, the aircraft is substantially the same as that in Example 1. The aircraft is characterized that it is further provided with movable wings 10. Specifically, two movable wings 10 are arranged on the bottom of the body 3, each movable wing 10 is connected with the lower end of a vertical third pivot 11 which protrudes out of the body 3. The width of each of the movable wings 10 is less than or equal to half of the width of the body 3. Thus, when the aircraft performs horizontal flight in the air after taking off, the movable wings 10 can be deployed, thus increasing the flight lift, reducing energy consumption, extending flight distance and improving safety when flying. When the aircraft travels on the ground, the movable wings 10 can be all stowed in the bottom of the body 3, so as to reduce the occupied area, avoid hurting pedestrians and reduce the risk of scratching with other objects.

It is also possible to replace the movable wings 10 in this example with foldable wings in order to increase flight lift.

Example 5

Figure 12:
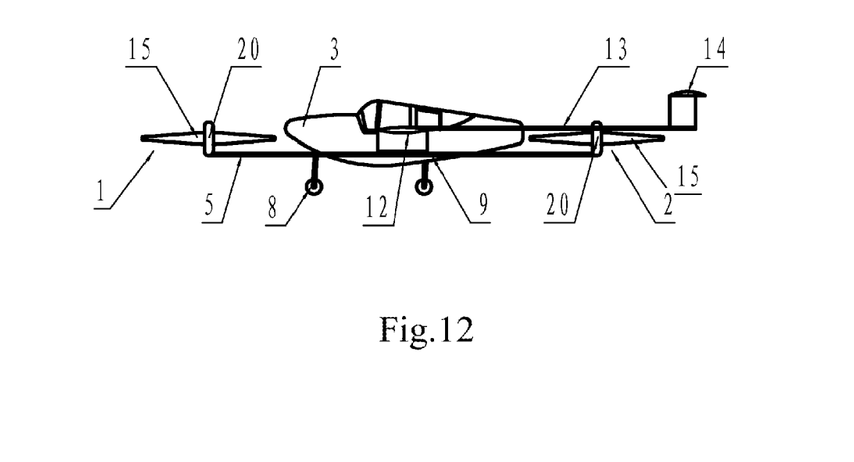
FIG. 12 is a schematic view of an aircraft according to the invention, wherein the aircraft is further provided with fixed wings.
Figure 13:
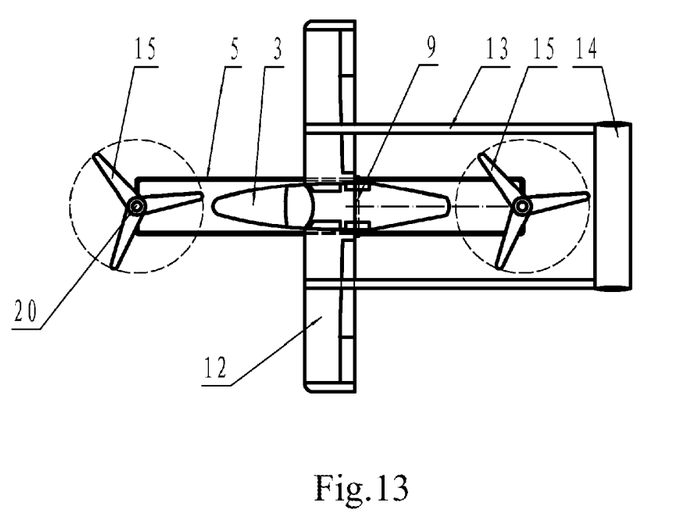
FIG. 13 is a top view of the aircraft shown in FIG. 12.

As shown in FIG. 12 and FIG. 13, the body 3 of the aircraft is a small aircraft structure with a cockpit and fixed wings. An autopilot, a drive device and a pivot rotation controller, etc. are arranged in the body 3. Wheels 8 are installed on the bottom of the body 3; on both sides of the body 3 are arranged transmission brace rods 5 to which the front and rear thrusters are installed; at the middle position of the transmission brace rods 5 are connected the two protruding ends of the first pivot 9 passing transversely through the middle portion of the body 3. The first pivot 9 passing through the body 3 is controlled by the pivot rotation controller to perform a tilt of power.

In FIG. 13, between the front ends of the two transmission brace rods 5 is arranged a front end beam, on which the front thruster 1 is installed; between the rear ends of the two transmission brace rods 5 is arranged a rear end beam, on which the rear thruster 2 is installed. The front thruster 1, the rear thruster 2 and the body 3 are aligned in the longitudinal direction. Both the front thruster 1 and the rear thruster 2 are propellers each consisting of a rotor 15 and a propeller shaft 20 which are connected.

In FIG. 13, fixed wings 12 are connected to both sides of the body 3, and on the fixed wings 12 are connected two tail brace rods 13 stretching horizontally backwards. On the rear ends of the two tail brace rods 13 is fixed a tail 14. The tail 14 is located behind the rear thruster 2, and preferably, the tail is positioned so as not to interfere with the tilt of the rear thruster 2.

Example 6

Figure 14:
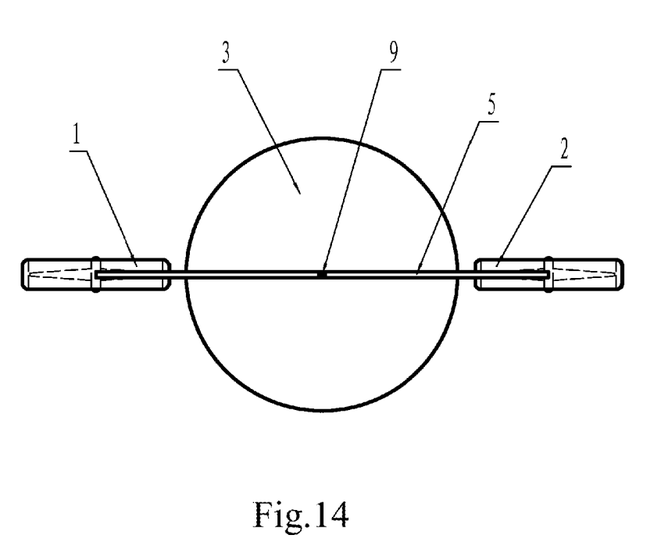
FIG. 14 is a schematic view of an aircraft according to the invention, wherein two thrusters are provided on each of the front and rear portions of a body.
Figure 15:
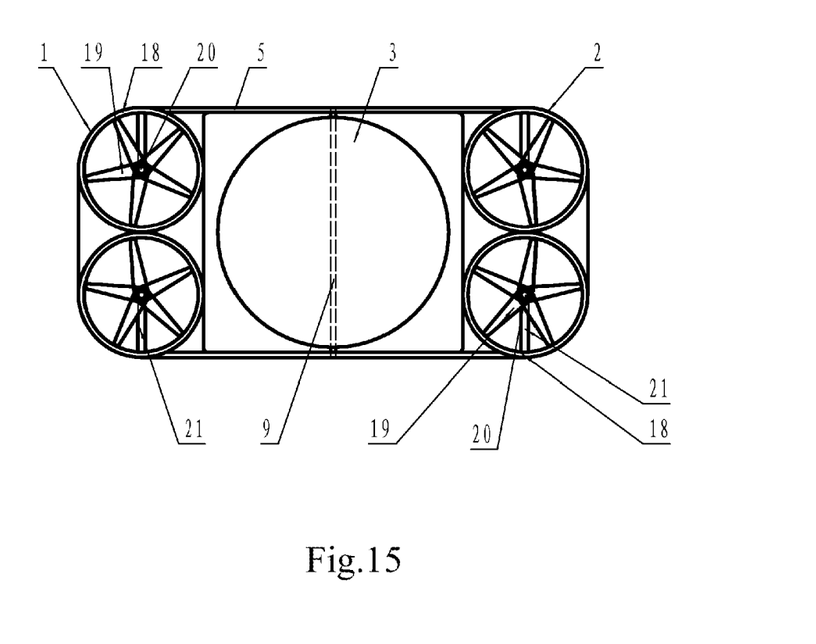
FIG. 15 is a top view of the aircraft shown in FIG. 14.

As shown in FIG. 14 and FIG. 15, the body 3 of the aircraft is a spherical body. An autopilot, a derive device and a pivot rotation controller etc. are installed in the body 3. In FIG. 15, transmission brace rods 5 are arranged in parallel on both sides of the body 3 and are perpendicularly connected at their middle points with a first pivot 9 passing transversely through the body 3 in the horizontal diameter. Between the front ends of the two transmission brace rods 5 are connected two front thrusters 1 arranged side by side, and between the rear ends of the two transmission brace rods 5 are connected two rear thrusters 2 arranged side by side; the front thrusters and the rear thrusters are located in front and back of the body 3 respectively. The front thrusters 1 and the rear thrusters 2 both comprise ducted fans each consisting of a duct 18, blades 19, a propeller shaft 20 and a drive shaft 21. The two front thrusters 1 and the two rear thrusters 2 are aligned in the longitudinal direction.

In the body 3 is installed driving means, which drive the two front thrusters 1 and the two rear thrusters 2 via a transmission mechanism installed in the first pivot 9 and the two transmission brace rods 5 and finally through four drive shafts 21 respectively, so as to provide power for flight and take-off/landing.

Because the aircraft has four thrusters, the thrusting requirements can thus be satisfied when the aircraft carries heavy load. The aircraft can serve as an unmanned aerial vehicle.

Example 7

Figure 16:
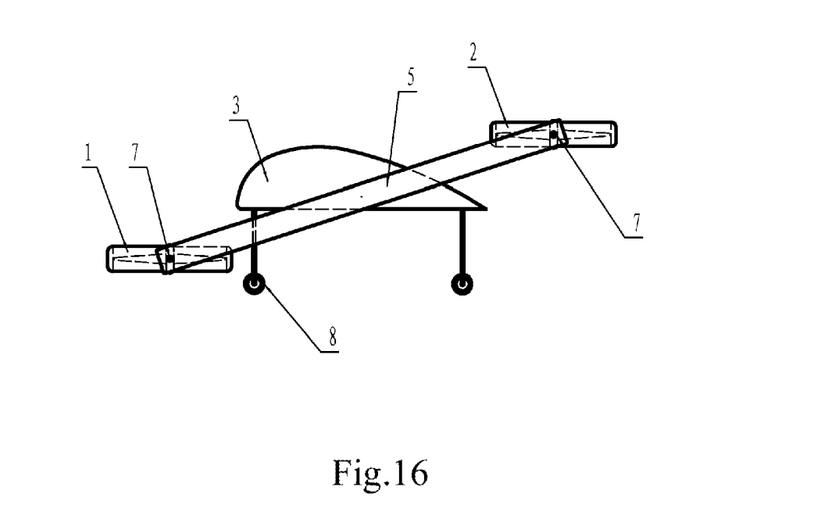
FIG. 16 is a schematic view of an aircraft according to the invention, wherein a transmission brace rod is fixed to a body.
Figure 17:
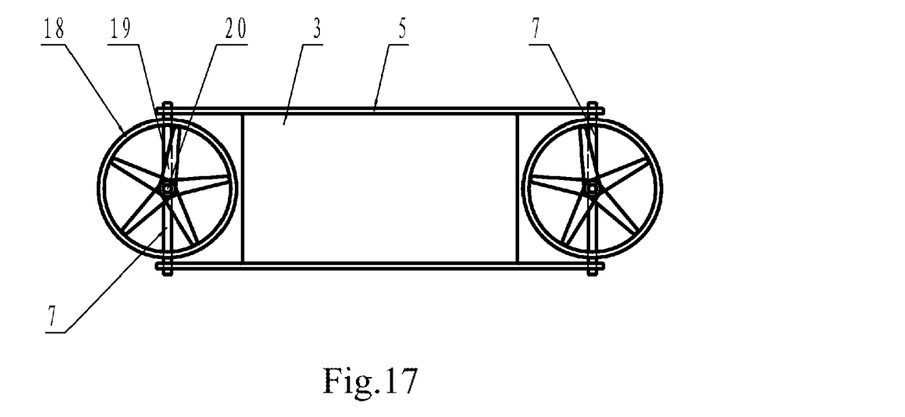
FIG. 17 is a top view of the aircraft shown in FIG. 16.

As shown in FIG. 16 and FIG. 17, the aircraft is a aircraft with fixed transmission brace rods and controlled tilting front and rear thrusters for use on land and in the air. On each side of body 3 is connected one transmission brace rod 5 which is arranged obliquely with a lower front end and higher rear end (the rod and the horizontal line define an angle of about 22.5° therebetween). The two transmission brace rods 5 are parallel to each other. On the front and rear ends of the two transmission brace rods 5 are respectively connected second pivots 7 which are arranged transversely. On the front second pivot 7 is connected with a front thruster 1 while on the rear second pivot 7 is connected with a rear thruster 2. The front and rear thrusters are positioned in front and back of the body 3 respectively and are aligned with the body 3 in the longitudinal direction. Both the front thruster 1 and the rear thruster 2 comprise ducted fans each consisting of a duct 18, blades 19 and a propeller shaft 20, etc. The ducted fan may be also provided with transverse and/or longitudinal deflectors.

Wheels 8 installed on the body 3 may be of a fixed or retractable structure. The drive device in the body 3 controls the wheels 8, which can make the body 3 to move and travel on the ground.

Figure 18:
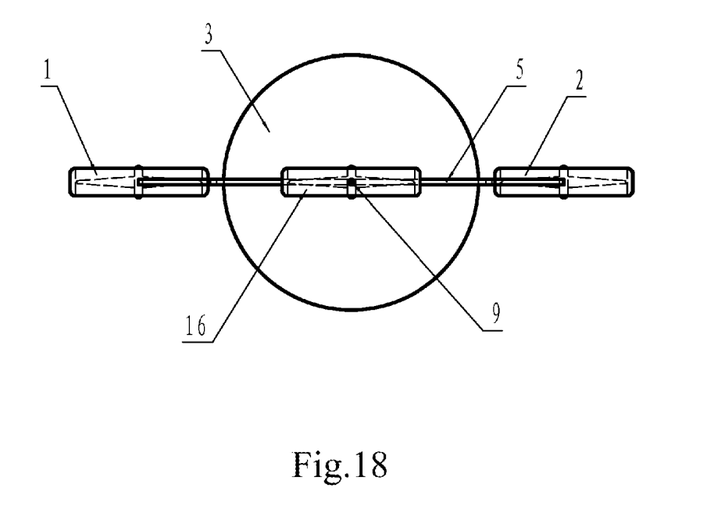
FIG. 18 is a schematic view of the aircraft in FIG. 16, wherein the aircraft is flying at a maximum speed.

In FIG. 18, with the aircraft flying at high speed in the horizontal direction, the front and rear thrusters are in vertical state. By adjusting the tilting angles of the front and rear thrusters, the aircraft can perform vertical take-off and landing, and horizontal flight respectively.

Example 8

Figure 19:
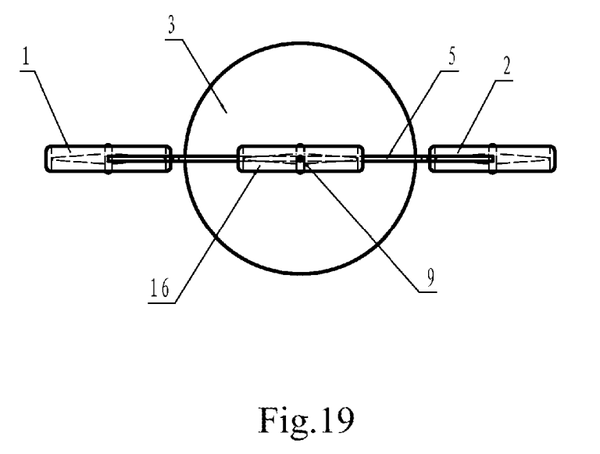
FIG. 19 is a schematic view of an aircraft according to the invention, wherein the aircraft has a spherical body.
Figure 20:
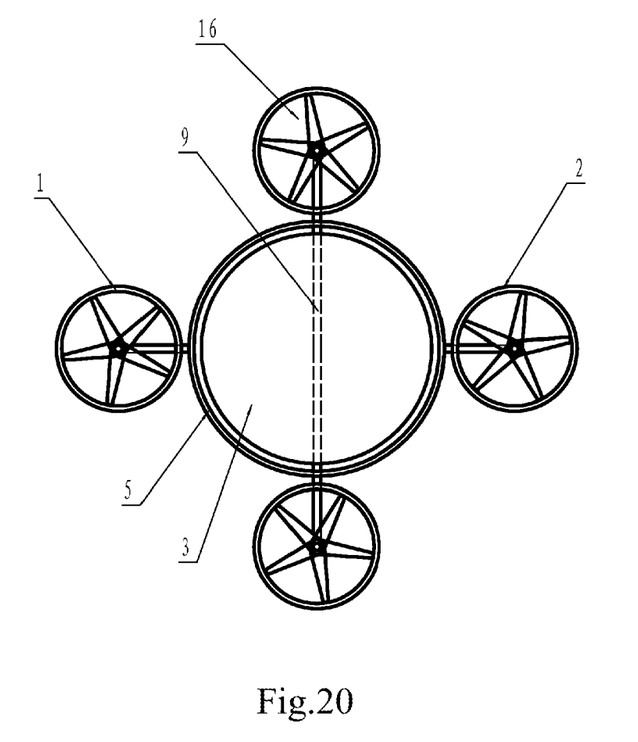
FIG. 20 is a top view of the aircraft shown in FIG. 19.

As shown in FIG. 19 and FIG. 20, the aircraft is also a kind of spherical aircraft, wherein the body 3 is a spherical body. A transmission brace rod 5 includes: an intermediate torus surrounding around the outside of the body; and, front and rear straight protruding segments connected with the torus. The front and rear protruding segments are connected with a front thruster 1 and a rear thruster 2 respectively. A first pivot 9 passes transversely through the body 3 in the horizontal diameter, extends out of the torus of the transmission brace rod 5, and then connected to lateral thrusters 16.

The front and rear thrusters are positioned in front and back of the body 3 and are aligned with the body 3 in the longitudinal direction. The front and rear thrusters and the lateral thrusters may comprise a ducted fan or a turbofan engine. An engine or a motor may be installed on the ducted fan to directly drive the blades, so as to provide flight or takeoff/landing power for the body 3.

The body 3 of the spherical aircraft has larger interior space, and thus can carry heavy load and serve as a kind of spherical robot.

Example 9

Figure 21:
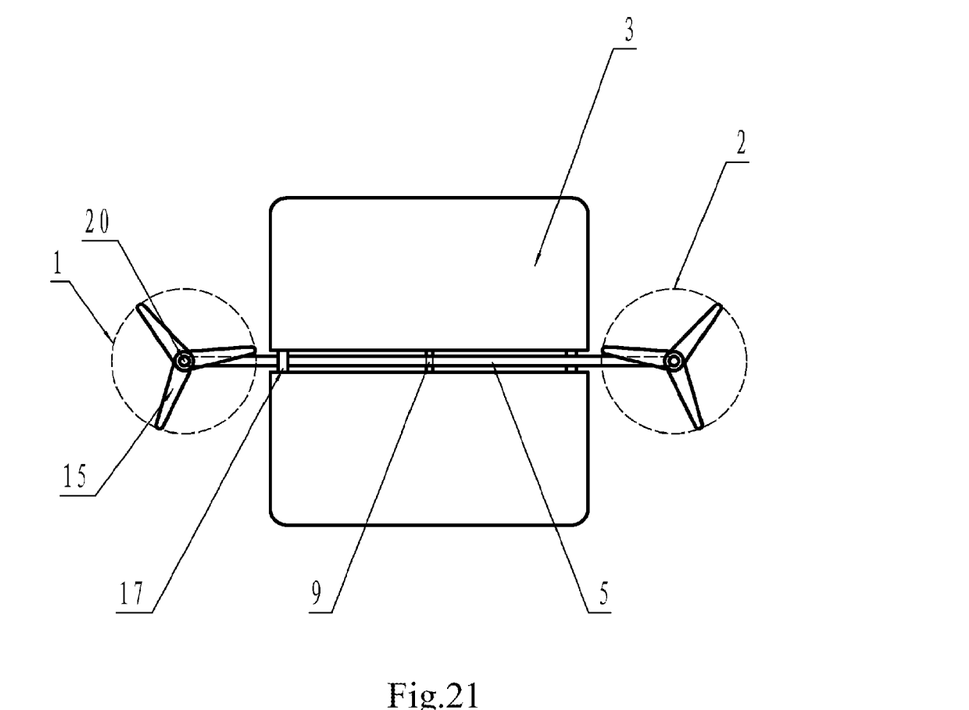
FIG. 21 is a schematic view of an aircraft according to the invention, wherein the aircraft has two bodies.
Figure 22:
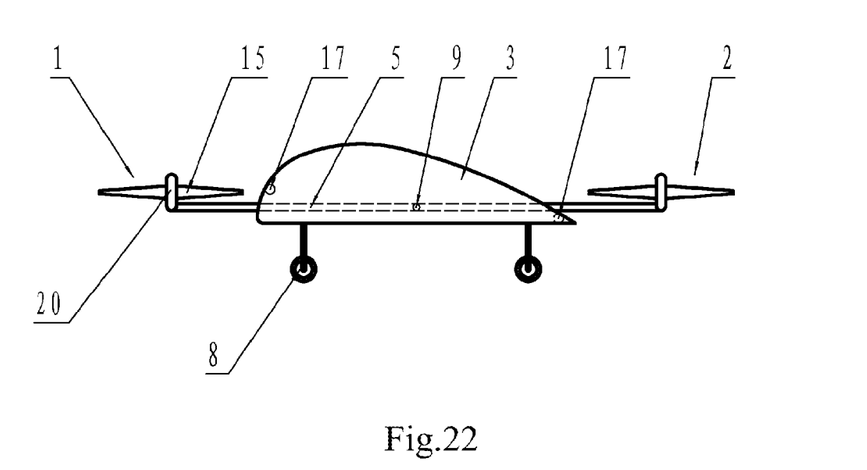
FIG. 22 is a bottom view of the aircraft shown in FIG. 21.

As shown in FIG. 21 and FIG. 22, the aircraft is a twin-fuselage aircraft. Two symmetrical bodies 3 are arranged side by side and connected together by means of two front and rear levers 17 between the bodies. On the bottoms of the two bodies 3 are both arranged with wheels 8 and in one or two of the bodies 3 are installed an autopilot, a drive device and a pivot controller, etc. A first pivot 9 passes transversely through the middle portions of the two bodies 3, and a transmission brace rod 5 is located in a gap between the two bodies and perpendicularly connected with the first pivot 9. On the front end of the transmission brace rod 5 is connected with a front thruster 1 and on the rear end is connected with a rear thruster 2. The front and the rear thrusters are propellers each consisting of a rotor 15 and a propeller shaft 20 which are connected. Ducted fans or turbofan engines may also be used as the front and rear thrusters. The first pivot 9 passing through the body 3 is controlled by the pivot rotation controller, so as to control the tilt of the propellers.

A deployed movable wing may be installed on the bottom of each of the two bodies of the aircraft respectively, and the width of the movable wings may be increased appropriately. The aircraft may also serve as an unmanned aerial vehicle.

The present invention is not limited to the above preferred examples, and these examples are only used to illustrate the invention. Obviously, in the present invention, many other changes, modifications and applications are possible.

The aircraft for use on land and in the air of the present invention operates in the following manners:

1. Flight mode in the air: body 3, front thruster 1 and rear thruster 2 are horizontally arranged; the driving means installed in body 3 drives the front and rear thrusters to rotate at a high speed by means of transmission brace rod 5 respectively, thereby generating thrust forces in vertical downwards direction, or two separate driving means (such as motors) may be used to drive the thrusters at a high speed respectively to generate thrust forces. By slowly increasing the thrust forces generated by the front and the rear thrusters, the aircraft can vertically take off slowly. After the aircraft climbs to a certain height, the front and rear thrusters are driven by the transmission brace rod 5 to be synchronously tilted by an angle of 37° (tilt angle ≤90°) with the first pivot 9 as a fulcrum by means of the thrust difference of the front and the rear thrusters, or using the pivot rotation controller. At this time, the thrust force generated by the front and the rear thrusters is divided into a horizontal force providing forward power for the aircraft and a vertical force providing lift force for the aircraft, respectively. Body 3 with its external aerodynamic appearance can also provide lift force for the aircraft. With these conditions, the aircraft can perform quick horizontal flight in the air.

When the aircraft is required to fly at a high speed, the front and rear thrusters are controlled to tilt by an angle of up to 90°. Then, the thrust force generated by the front and rear thrusters is all used as a forward thrust for the aircraft while the lift force for the aircraft will be provided by the body 3. In this flight state, the aircraft is flying horizontally at a maximum speed and in the most economic manner.

When the aircraft is to land, the front and rear thrusters are driven by the transmission brace rod 5 to be tilted synchronously to their initial horizontal positions with the first pivot 9 as a fulcrum by means of the thrust difference of the front and the rear thrusters (or under the action of the pivot rotation controller). At this time, the thrust force generated by the front and rear thrusters is all used to provide lift force for the aircraft. At the same time, by slowly reducing the thrust force of the front and rear thrusters, the aircraft can slowly land on the ground.

During the entire flight and take-off/landing, the body 3 of the aircraft always remains in the horizontal state, thereby facilitating air/land conversion, making the occupants feel comfortable and providing them with broad vision.

2. Vehicle mode on the ground: the front thruster 1, the rear thruster 2 and the body 3 are locked into one integral piece under the action of the transmission brace rod 5 and the first pivot 9. Thus, under the action of wheels 8, the aircraft can travel on the ground just as an ordinary vehicle.

What is claimed is:

1. A vertical take-off and landing aircraft with tiltable power for use on land and in the air, including:
a body provided with a drive device;
wheels controlled by said drive device to make said body move on the land; and
a front thruster and a rear thruster controlling said body to fly or take off/land,
wherein two transmission brace rods are arranged so that one transmission brace rod is on each side, a first pivot passes transversely through said body, and the first pivot is connected with said two transmission brace rods on both sides of said body so as to collectively constitute an H-shaped carrying-sedan structure;
said front thruster is located in front of said body and fixedly connected between front ends of the two transmission brace rods;
said rear thruster is located in back of said body and fixedly connected between rear ends of the two transmission brace rods;
said front thruster and said rear thruster are longitudinally aligned with said body;
central axes of said front thruster and said rear thruster are perpendicular to a plane formed by the two transmission brace rods; and
each of said front thruster and said rear thruster comprises a ducted fan including a duct, blades and a propeller shaft, and each of said ducted fans is further provided with at least one of a transverse or a longitudinal deflector to improve air flow guidance control.

2. The aircraft for use on land and in the air according to claim 1, wherein said first pivot passes transversely through a middle portion of said body and is connected to the transmission brace rods at their middle points; said transmission brace rods driven by the first pivot are tiltable in a range of 0-90°, so that said front thruster is tilted downwards and said rear thruster is tilted upwards.

3. The aircraft for use on land and in the air according to claim 2, wherein lateral thrusters are arranged at an outside of said two transmission brace rods and are connected to ends of said first pivot respectively.

4. The aircraft for use on land and in the air according to claim 1, wherein said first pivot passes transversely through a tail portion of said body and is connected to rear segments of said transmission brace rod; a deflection control mechanism is connected between said body and said transmission brace rods; and said transmission brace rods driven by said deflection control mechanism are tiltable in a range of 0-90° so that said front thruster is tilted downwards and said rear thruster is tilted upwards.

5. The aircraft for use on land and in the air according to claim 1, wherein said body is provided with fixed wings, folded wings or movable wings.

6. The aircraft for use on land and in the air according to claim 5, wherein said fixed wings are connected on both sides of said body, tail brace rods stretching horizontally backwards are connected to said fixed wings, and a tail is fixed onto the rear end of said tail brace rod.

7. The aircraft for use on land and in the air according to claim 1, wherein said wheels are of a fixed or retractable structure, installed on said body, or installed on said front thruster and said rear thruster respectively.

8. The aircraft for use on land and in the air according to claim 1, wherein driving means for driving said front thruster and said rear thruster to rotate are installed in said body or installed in said front thruster and said rear thruster.

9. The aircraft for use on land and in the air according to claim 1, wherein the aircraft is provided with a whole-aircraft parachute installed on said body to enhance aircraft safety.

* * * * *